United States Patent Office 3,440,817
Patented Apr. 29, 1969

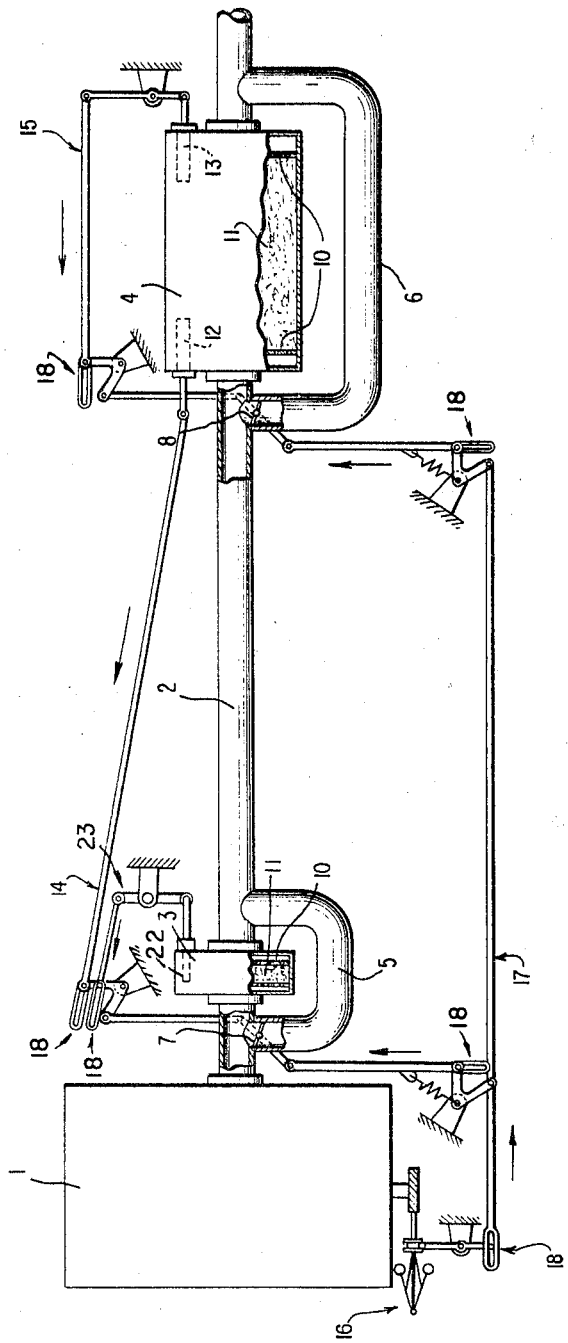

3,440,817
CATALYTIC CONVERTER SYSTEM FOR EXHAUST GASES OF INTERNAL COMBUSTION ENGINES
Helmut Säufferer, Waiblingen, Germany, assignor to Daimler-Benz Aktiengesellschaft, Stuttgart-Unterturkheim, Germany
Filed Sept. 3, 1964, Ser. No. 394,187
Claims priority, application Germany, Sept. 7, 1963, D 42,425
Int. Cl. F02b 75/10
U.S. Cl. 60—29        15 Claims

ABSTRACT OF THE DISCLOSURE

A conversion system for exhaust gases, having a small, quick-warm-up catalytic unit located near the engine and a main catalytic unit downstream, with provisions for by-passing in dependence on the catalyst temperature and on the engine operating conditions.

---

The present invention relates to an installation for the catalytic converter system for the exhaust gases of internal combustion engines, especially in motor vehicles. With such types of installation it is often of decisive importance that the catalytic conversion of the exhaust gases is fully operative within quite a short time after the starting of the internal combustion engine because particularly in the first minutes after the starting, when the engine is still relatively cool, many component parts harmful to health are contained in the exhaust gases.

Since the installation for the catalytic converter requires a relatively large space in the motor vehicle, it is not possible as a rule to accommodate the same near the vehicle driving engine in the engine compartment. If placed within the area of the normal location of the conventional muffler, then this requires relatively long exhaust gas lines between the driving engine and the converter installation for the conversion of the exhaust gases thereof. As a result thereof, the exhaust gases are cooled off considerably along the path thereof from the engine to the converter installation and relatively much time elapses until the converter installation is heated to such an extent that the catalytic substances contained therein are fully effective. This shortcoming is eliminated by the present invention.

According to the present invention the converter installation is subdivided into two self-contained units, each capable of operating by itself, of which the smaller unit containing only a fraction of the entire catalytic substance or mass is arranged as close as possible to the drive unit whereas the other unit containing the main portion of the catalytic substance or mass is arranged at any other appropriate place in the vehicle. Appropriately, bypass lines with deflector valves are provided both at the smaller as well as the larger unit so that the exhaust gases can be selectively conducted in bypassing relationship about each of the two units, as desired. It is to be achieved thereby that, on the one hand, the flow resistance of the entire converter system installation can be matched to the rate of air flow under the different engine operating conditions and, on the other, the catalytic substances in the pre-unit and in the main unit are protected against excessive temperatures.

Accordingly, it is an object of the present invention to provide converter system installation for motor vehicles which eliminates by extremely simple and operationally reliable means the aforementioned shortcomings and drawbacks encountered with the prior art constructions.

Another object of the present invention resides in the provision of a converter system installation for motor vehicles enabling the elimination of harmful gases under all operating conditions, even only a relatively short time after starting of the engine.

Still another object of the present invention resides in the provision of a converter system for motor vehicles which takes into consideration the limitations as regards space existing in motor vehicles and makes possible a purposeful and appropriate location of the converter units which achieve the aforementioned aims and objects.

Still a further object of the present invention resides in the provision of a converter installation which becomes fully effective already a relatively short time after starting of the engine.

Another object of the present invention resides in the provision of a converter system for motor vehicles in which the various parts can be so designed and selected as to be matched to certain characteristics of the engine under all operating circumstances.

A further object of the present invention resides in the provision of a converter system for motor vehicles which results in a relatively low cost for the construction and manufacture of various parts thereof.

These and other objects, features and advantages of the present invention will become more obvious from the following description when taken in connection with the accompanying drawing which shows, in a single figure thereof, one embodiment in accordance with the present invention.

Referring now to the single figure of drawing which represents a schematic view of one embodiment of a converter system for motor vehicles in accordance with the present invention, reference numeral 1 designates therein a conventional internal combustion engine arranged within the motor vehicle (not shown) and serving as driving engine for the same. The exhaust gas system includes an exhaust gas line 2 operatively connected with the exhaust manifold of the internal combustion engine 1 in any conventional manner and including two separate, self-contained converter devices 3 and 4 of conventional construction for the catalytic conversion of the exhaust gases passing from the internal combustion engine 1 through line 2 into the atmosphere. The two converter units 3 and 4 are arranged in the exhaust gas line 2 one behind the other, and more particularly, the unit 3 is located directly at the place of the internal combustion engine 1 and the unit 4 at any other suitable place in the vehicle, for example, in a recess of the vehicle floor, underneath the seats or like. Additionally, the units 3 and 4, possibly by the use of resonance volumes, may take over the role of exhaust mufflers.

The two parts 3 and 4 form sub-units of the overall installation for the conversion of the exhaust gases. Each of these sub-units 3 and 4 is filled, as is conventional, with a catalytic mass or substance consisting of catalyst carrier and catalyst substance, enhancing the conversion of the noxious component parts of the exhaust gases, and is provided with conventional means (not illustrated) for the introduction or admission of supplementary air. The subdivision of the overall installation into the two sub-units takes place in such a manner that the pre-unit 3 accommodates about ¼ to ⅕ of the entire required catalytic mass while the main unit 4 receives about ¾ to ⅘ of the entire required catalytic mass. Bypass lines 5 and 6 are provided both at the pre-unit 3 as well as at the main unit 4, respectively, which may be selectively opened and closed, as necessary, by deflector valves 7 and 8 of conventional construction. The control of these valves 7 and 8 is achieved by a suitable control mechanism of any conventional construction in dependence on the engine operating condition and on the temperature of the catalytic masses in the sub-units 3 and 4.

The control of valves 7 and 8 by the control mechanism takes place in such a manner that with cold starting of the internal combustion engine 1, at first both bypass lines 5 and 6 are closed off by the valves 7 and 8. The exhaust gases then flow at first through the sub-unit 3. They heat up thereby the catalytic mass contained therein up to the response temperature thereof, for instance, up to a temperature of 250° C.–300° C., which takes place relatively rapidly since the exhaust gases still have a sufficiently high temperature at the location of the sub-unit 3 adjacent the engine even with a throttled engine operation and the amount of catalyst in the sub-unit 3 relatively slight. Possibly, the pre-unit 3 and main unit 4 as well as the connecting line 2 may be surrounded with a suitable heat-insulation.

It is assumed that the internal combustion engine 1 has a nominal output of 100 HP and, after starting of the engine, is warmed up by being driven with an output of about 20 HP as is usually the case in city traffic. In that case, an exhaust quantity of 1 m.³ per minute (related to 20° C.) and an exhaust temperature of 450° C. can be expected. If one assumes further a temperature drop of the exhaust gases of 250° C. in the pre-unit 3, then for purposes of heating the catalytic mass contained in the pre-unit 3, the following yield of heat may be expected:

$$Q \text{ exhaust} = 0.25 \frac{\text{cal.}}{\text{gr.}} ° C. \cdot 1300 \frac{\text{gr.}}{\text{min.}} \cdot 250° C. = 81 \frac{\text{cal.}}{\text{min.}}$$

About 0.8 kg. of catalytic mass is to be present in the pre-unit 3 with a specific heat of 0.23 cal./gr. ° C. Then the following heat quantity is necessary for achieving the response temperature of the catalyst of, for example, 300° C. with a starting temperature of 20° C.:

$$Q_{\text{cat.}} = 0.23 \cdot 800 \cdot 280 = 51 \text{ cal.}$$

The same calculation gives for the sheet metal housing containing the catalyst which is also to be heated to 300° C. and whose weight is assumed to be 0.7 kg., the following heat quantity:

$$Q_{\text{ge}} = 0.1 \cdot 700 \cdot 280 = 20 \text{ cal.}$$

Hence, for heating the pre-unit 3 one needs about $51 + 20 = 71$ cal. Since, as determined above, 81 cal. are supplied during warm-up of the engine by the hot exhaust gases, the pre-unit 3 can be heated to the response temperature of the catalyst in about $$\frac{71}{81} \text{ min.} = 52 \text{ sec.}$$

If the engine output is now increased, then the catalyst mass in the pre-unit 3 is heated both by the increasing exhaust gas temperature as well as also by the combustion heat resulting from the catalyst reaction.

The converted exhaust gases have, since both effects combine, such a relatively high temperature downstream of the pre-unit 3 that notwithstanding the long connecting line between the two sub-units 3 and 4 they heat up in a relatively short time also the catalyst mass contained in the main unit 4 of about 4 kg. and the housing thereof to the response temperature of the catalyst. The main unit 4 is from then on in a condition to carry out alone in a far-reaching manner the conversion for the entire exhaust gas quantity as may occur also with increased output in the engine 1. Consequently, as soon as the catalytic mass in the main unit 4 reaches the response temperature thereof the deflector valve 7 is so shifted that it opens up to the largest portion of the exhaust gases the path bypassing the pre-unit 3 through the bypass line 5. The catalytic mass present in the pre-unit 3 is thereby protected against premature exhaustion or poisoning, for example, by the lead content of the fuel, as well as against excessive temperatures. Excessive temperatures are to be expected particularly when, for example, one spark plug becomes inoperative and consequently large quantities of un-burned fuel are reacted in the catalyst.

The described subdivision of the converter installation into a pre-unit and into a main-unit offers additionally the advantage that only for the housing of the thermally more loaded pre-unit, expensive and highly-resistant steels have to be used whereas for the main unit the usual types of steel can be used. This is important in order to be able to keep the price of the converter system relatively low within tolerable limits compared to the overall manufacturing cost of the vehicle itself.

To achieve the aforementioned automatic control, there may be provided on the inside of the units 3 and 4 perforated or apertured plates 10 which serve for the distribution of the exhaust gases. The catalytic substances 11 are disposed between these perforated plates 10. The main converter unit has two heat-sensing devices 12 and 13 of any conventional construction. The heat-sensing device 12 controls, by way of a linkage 14, the control valve 7 at the forwardly disposed pre-unit. This takes place in such a manner that the by-pass line 5 is opened as soon as the catalyst in the main converter unit 4 reaches the response temperature. The second heat-sensing device 13 controls, by way of linkage 15, the control valve or by-pass valve 8 such that upon reaching the maximum permissive temperature in the catalyst of the main unit 4, the by-pass valve is opened. The pre-unit is also provided with a conventional heat-sensing device 22 which controls, by way of a linkage 23, the control valve 7 in the pre-unit 3. This takes place again in such a manner that upon reaching the maximum permissive temperature in the catalyst of the pre-unit 3, the by-pass valve 7 is opened.

The centrifugal governor 16, driven by the engine 1, controls by way of linkage 17, both valves 7 and 8 in dependence on the rotational speed of the engine, that is, generally speaking, in dependence on the rate of air flow through the engine. A lost motion connection 18, using, for instance, an elongated aperture, may be provided in the linkage 17 and in the other linkages 14 and 15 at suitable places and in a conventional manner, such that the control impulses cannot mutually interfere. It is to be understood that any conventional control arrangement may be used for the aforementioned automatic control of the by-pass valves 7 and 8.

The term "rate of air flow" in connection with an internal combustion engine is a well-known term, referring to the air quantity or mixture quantity in kg. or kmol. per cycle or time unit of the engine. As is well known, the rate of air flow of an internal combustion engine is, with an approximately stoichiometric mixture composition, a measurement for the output of the engine and therewith simultaneously also for the thermal load of the engine as well as also for the catalyst unit connected downstream thereof. The position of the throttle valve in the suction line of the engine, on the one hand, and the rotational speed of the engine, on the other, are determinative for the rate of air flow, for example, per hour, or any other time unit. As is well known in internal combustion engines, for example, the same rate of air flow may be present with the same engine with a far-reachingly closed throttle valve and high rotational speeds as also with opened throttle valve and low rotational speeds. Between the extreme conditions an indefinitely large number of other operating conditions of the engines exist which are normally referred to as the different operating conditions of the engine.

*Operation*

The operation of the converter system in accordance with the present invention during starting of the engine is as follows:

The by-pass valve 7 for the by-pass line 5 of the smaller unit 3 is initially closed during the starting of the engine 1. As the engine starts to operate, the valve 7 is opened increasingly by the heat-sensitive device 12 arranged at the forward end of the larger unit 4 as soon as the catalyst mass in the unit 4 reaches its response temperature. When the temperature of the catalyst mass in the larger unit 4 exceeds the maximum permissive temperature, the by-pass valve 8 for the by-pass line 6 of the larger unit is also opened by the heat-sensing device 13 arranged at the rear end of the larger unit 4 so that the principal part of the total exhaust quantity is then conducted into the atmosphere in by-passing relationship about both catalyst units 3 and 4. This condition occurs practically only when the driving engine 1, for example, on inclined roads, has to produce maximum output or if by reason of failure of a spark plug of the driving engine an abnormally large amount of non-combusted components occur in the exhaust gases. When the driving engine operates with high rotational speed but without maximum output, yet a larger amount of exhaust gases are produced, for example, during fast driving on flat roads, the case may also occur that the catalyst temperature in the larger unit 4 does not exceed its maximum permissive temperature while the exhaust gases in this operating condition of the engine contain only few non-combusted combustion parts. In this case, both valves 7 and 8 are opened by the centrifugal governor 16 in order to decrease, as already mentioned above, the flow resistance of the entire exhaust gas-line system. The heat-sensitive device 22 arranged in the smaller unit 3 additionally influences the valve 7 in that it opens this valve as soon as the temperature in the catalyst mass of the unit 3 increases beyond a maximum permissive value for the catalyst thereof. The minimum temperature at which the catalyst mass begins to operate, and the maximum temperature at which the catalyst mass is influenced in an unfavorable manner or even rendered unusable, depends in each case on the chemical nature of the utilized catalyst and may be selected accordingly as is well known to a person skilled in the art.

While I have shown and described one embodiment in accordance with the present invention, it is obvious that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

1. An installation for the catalytic conversion of exhaust gases from an internal combustion engine having an exhaust manifold, especially in motor vehicles having a vehicle floor; comprising:
   an exhaust gas line means leading from said manifold into the atmosphere including an exhaust line and two separate, self-contained exhaust gas converter units each operable by itself, one of said units being operable as quick-warm-up unit, being smaller, containing only a fraction of the entire catalyst mass and being located in said exhaust gas line means near the exhaust manifold and the other unit containing the main mass of the catalyst and being arranged in said exhaust line a considerable distance downstream of said smaller unit, said other unit containing several times the catalyst mass in said one unit and being relatively larger in its physical dimensions in relation to said one unit, the smaller unit containing about one-fourth to one-fifth of the entire necessary catalyst mass while the larger unit contains about three-fourths to four-fifths of said catalyst mass, and by-pass line means connected in said exhaust gas line means in by-passing relationship with a respective unit, each by-pass line means including deflector valve means operable to be opened and closed.

2. An installation according to claim 1, further comprising control means for selectively opening and closing said deflector valve means in dependence on the operating conditions of the engine and on the temperature of a respective catalyst mass.

3. An installation according to claim 2, wherein said control means includes heat-sensing means in each of said units for sensing the temperature of a respective catalyst mass, and means operatively connecting the heat-sensing means with respective valve means in such a manner that the corresponding valve means is opened upon exceeding a predetermined temperature of the respective catalyst mass to open the corresponding by-pass line means.

4. An installation according to claim 3, wherein said control means is operable to provide minimum flow resistance in the exhaust gas line means under predetermined operating conditions to match the adjustment of the valve means to the rate of air flow at different engine operating conditions.

5. An installation for the catalytic conversion of exhaust gases from an internal combustion engine having an exhaust manifold, especially in motor vehicles having a vehicle floor; comprising:
   an exhaust gas line means leading from said manifold into the atmosphere including an exhaust line and two separate, self-contained exhaust gas converter units each operable by itself, one of said units being operable as quick-warm-up unit, being smaller, containing only a fraction of the entire catalyst mass and being located in said exhaust gas line means near the exhaust manifold and the other unit containing the main mass of the catalyst and being arranged in said exhaust line a considerable distance downstream of said smaller unit, said other unit containing several times the catalyst mass in said one unit and being relatively larger in its physical dimensions in relation to said one unit,
   by-pass line means in said exhaust gas line means for each of said unit to by-pass the same, deflector valve means in each of said by-pass line means for selectively opening and closing the same and control means for selectively and automatically opening and closing said valve means in dependence on the operating conditions of the engine and the temperature of a respective catalyst mass.

6. An installation according to claim 5, wherein said control means includes heat-sensing means for sensing the temperature of the catalyst mass of each unit, and means operatively connecting the heat-sensing means with corresponding valve means for opening the corresponding valve means upon exceeding a predetermined temperature in the catalyst mass of a respective unit.

7. An installation for the catalytic conversion of exhaust gases from an internal combustion engine having an exhaust manifold, especially in motor vehicles having a vehicle floor; comprising:
   an exhaust gas line means leading from said manifold into the atmosphere including an exhaust line and two separate, self-contained exhaust gas converter units each operable by itself, one of said units being operable as quick-warm-up unit, being smaller, containing only a fraction of the entire catalyst mass and being located in said exhaust gas line means near the exhaust manifold and the other unit containing the main mass of the catalyst and being arranged in said exhaust line a considerable distance downstream of said smaller unit, said other unit containing several times the catalyst mass in said one unit and being relatively larger in its physical dimensions in relation to said one unit,
   said smaller unit being located immediately adjacent the exhaust manifold within the space occupied by the engine and the larger unit being located below the vehicle floor,
   the smaller unit containing about one-fourth to one-fifth of the entire necessary catalyst mass while the larger unit contains about three-fourths to four-fifths of said catalyst mass,
   by-pass line means in said exhaust gas line means by-passing a respective unit, selectively operable valve means in each by-pass line means, heat-sensing means in said larger unit and connecting means operatively connecting said heat-sensing means with said valve means in such a manner that the valve means associated with the by-pass line means of the smaller unit is opened as the temperature of the catalyst mass of the larger unit exceeds a predetermined temperature and that the valve means associated with the by-pass line means of the larger unit is opened as the catalyst mass thereof exceeds a predetermined maximum permissive temperature.

8. An installation according to claim 7, further comprising heat-sensing means in said smaller unit, and still further connecting means operatively connecting said last-mentioned heat-sensing means with the valve means of the by-pass line means associated with said smaller unit to open said last-mentioned valve means upon exceeding a predetermined temperature in the catalyst mass thereof, at least some of said connecting means including lost-motion connecting means.

9. An installation according to claim 7, further comprising means responsive to the operating conditions of the engine, and further connecting means operatively connecting said engine responsive means with said valve means.

10. An installation according to claim 9, further comprising heat-sensing means in said smaller unit, and still further connecting means operatively connecting said last-mentioned heat-sensing means with the valve means of the by-pass line means associated with said smaller unit to open said last-mentioned valve means upon exceeding a predetermined temperature in the catalyst mass thereof, at least some of said connecting means including lost-motion connecting means.

11. An installation according to claim 10, wherein said engine responsive means includes centrifugal governor means operating at a speed proportional to the engine speed.

12. An installation for the catalytic conversion of exhaust gases from an internal combustion engine having an exhaust manifold, especially in motor vehicles having a vehicle floor; comprising:

an exhaust gas line means leading from said manifold into the atmosphere including an exhaust line and two separate, self-contained exhaust gas converter units each operable by itself, one of said units being operable as a quick-warm-up unit, being smaller, containing only a fraction of the entire catalyst mass and being located in said exhaust gas line means near the exhaust manifold, and the other unit containing the main mass of the catalyst and being arranged in said exhaust line a considerable distance downstream of said smaller unit, said other unit containing several times the catalyst mass in said one unit and being relatively larger in its physical dimension in relation to said one unit, by-pass line means in said exhaust gas line means by-passing a respective unit, selectively operable valve means in each by-pass line means, heat-sensing means in said larger unit and connecting means operatively connecting said heat-sensing means with said valve means in such a manner that the valve means associated with the by-pass line means of the smaller unit is opened as the temperature of the catalyst mass of the larger unit exceeds a predetermined temperature and that the valve means associated with the by-pass line means of the larger unit is opened as the catalyst mass thereof exceeds a predetermined maximum permissive temperature.

13. An installation according to claim 12, further comprising means responsive to the operating conditions of the engine, and further connecting means operatively connecting said engine responsive means with said valve means.

14. An installation according to claim 13, further comprising heat-sensing means in said smaller unit, and still further connecting means operatively connecting said last-mentioned heat-sensing means with the valve means of the by-pass line means associated with said smaller unit to open said last-mentioned valve means upon exceeding a predetermined temperature in the catalyst mass thereof, at least some of said connecting means including lost-motion connecting means.

15. An installation according to claim 14, wherein said engine responsive means includes centrifugal governor means operating at a speed proportional to the engine speed.

References Cited

UNITED STATES PATENTS

| | | | |
|---|---|---|---|
| 2,664,340 | 12/1953 | Houdry, | |
| 3,065,595 | 11/1962 | Gary | 23—288 |
| 3,086,353 | 4/1963 | Ridgway | 23—288 |
| 3,086,839 | 4/1963 | Bloch | 23—288 |
| 3,116,596 | 1/1964 | Boehme et al. | 23—288 |
| 3,166,895 | 1/1965 | Slayter et al. | 23—288 XR |
| 3,176,461 | 4/1965 | Calvert | 23—288 |
| 3,180,712 | 4/1965 | Hamblin | 23—288 |
| 3,201,206 | 8/1965 | Wawriniok | 23—288 |

FOREIGN PATENTS

| | | |
|---|---|---|
| 448,850 | 6/1936 | Great Britain. |
| 933,943 | 8/1963 | Great Britain. |

JOSEPH SCOVRONEK, *Primary Examiner.*

U.S. Cl. X.R.

23—288